Jan. 18, 1927.
R. M. LOVEJOY
1,614,480
SPRING SHACKLE CONSTRUCTION FOR VEHICLES
Filed May 15, 1925
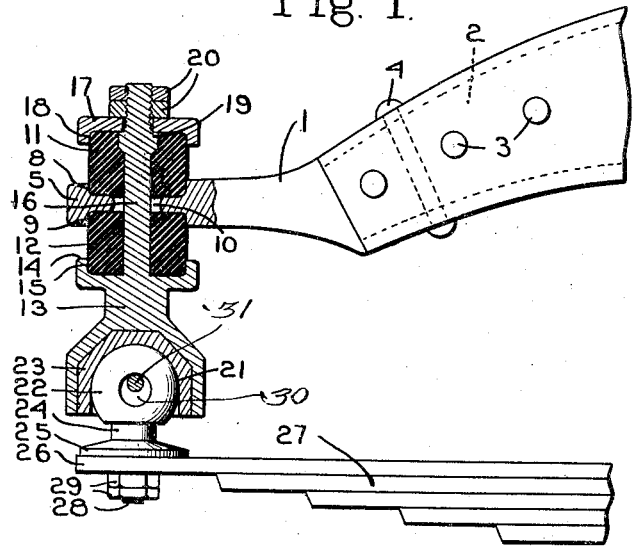
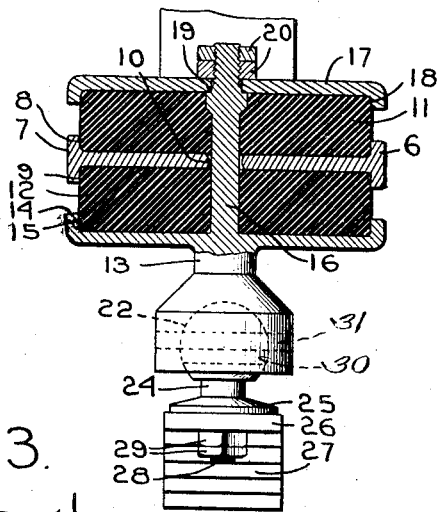
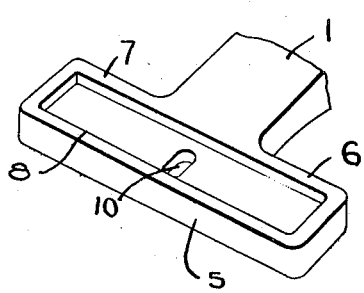
Inventor.
Ralph M. Lovejoy
by Heard Smith & Tennant.
Attys Patented Jan. 18, 1927.

1,614,480

UNITED STATES PATENT OFFICE.

RALPH M. LOVEJOY, OF BOSTON, MASSACHUSETTS.

SPRING-SHACKLE CONSTRUCTION FOR VEHICLES.

Application filed May 15, 1925. Serial No. 30,474.

This invention relates to improvements in spring shackle constructions and the principal object thereof is to provide a relatively simple, inexpensive and effective device for connecting a frame member to a spring member of a vehicle.

In usual spring shackle constructions for automobiles and like vehicles the shackle construction has comprised a housing which is secured to the frame. This housing is formed of cast metal and by reason of its shape is of more or less difficult and expensive construction.

One of the principal objects of the invention is to provide a shackle construction in which a forged extension for the frame of the vehicle may be employed, the forging being relatively simple and inexpensive in construction, and lighter and less easily broken than the usual cast metal housings.

A further object of the invention is to provide a spring shackle construction comprising a forged extension for the side frame with blocks of non-metallic resilient material clamped upon opposite sides of the frame by clamping means which are flexibly connected to the end portion of the spring.

A further object of the invention is to provide a novel spring shackle construction of the character specified which will permit relative longitudinal movement between the end of the spring and the frame and relatively little lateral movement therebetween.

Other objects and features of the invention will more fully appear from the following description and the accompanying drawing and will be particularly pointed out in the claims.

In the drawing:

Fig. 1 is a view, partially in vertical section, of a spring shackle embodying a preferred form of the invention;

Fig. 2 is a view, partially in vertical section, through the shackle in a plane at right angles to the plane of the section illustrated in Fig. 1; and, Fig. 3 is a detail view in perspective of the end portion of the frame extension.

The spring shackle construction embodying the present invention is illustrated herein as applied to the end of a side frame and spring of a vehicle, such as an automobile, and inasmuch as the vehicle construction may be of any usual type illustration thereof is not required for the purpose of full disclosure of this invention.

The invention comprises in its broad sense a spring shackle construction for connecting a frame member and a spring member of a vehicle comprising an extension of the frame member, non-metallic resilient members located on opposite sides of said extension, means for clamping said resilient members upon said extension and means flexibly connecting the clamping means to the end portion of the spring.

In the embodiment illustrated in the drawing the frame extension comprises a forging 1 having a shank 2, which preferably conforms to the configuration of the usual channel shaped converging end portion of the side frame and adapted to be secured to the side frame by suitable bolts or rivets 3 and 4. The frame extension 1 is provided with a substantially horizontal flat end portion 5 which desirably is of rectangular form, the portions 6 and 7 thereof extending a considerable distance laterally from the shank portion of the forging thereby presenting surfaces which are of narrow width in the longitudinal direction of the frame and spring and of relatively great width transversely thereof. This end portion of the forging desirably is provided upon opposite sides with upper and lower rectangular block-receiving seats or recesses 8 and 9 with a central aperture 10. An upper block 11 and a lower block 12 of non-metallic resilient material, such as rubber or rubber composition, are seated in the respective recesses 8 and 9 and are secured therein by clamping means having a flexible connection to the end portion of the spring.

The preferred form of clamping means illustrated in the accompanying drawing comprises a link member having a head 13, the upper face 14 of which is provided with a block-receiving recess 15 complementary to the recess 9. The shank or stem 16 of the link extends upwardly through the block 12, thence through the central aperture 10 of the forged frame extension, thence through the block 11 and through a cap 17 the lower face of which desirably is provided with a recess 18 complementary to the recess 8 to receive the upper end of the rubber block. Nuts 20 upon the upper end of said link serve when set up to draw the cap and head together and thereby clamp the blocks firmly upon the forged frame extension. The shank or stem 16 of the link member desirably is provided with a shoulder 19 to limit the clamping movement of the cap 17, and thereby to prevent too great compression of the resilient members during the assembling of the shackle.

The head of the link member desirably is provided with a socket 21 to receive a spherical bearing member 22, a lining 23 preferably of oil-soaked wood being interposed between the spherical bearing member and the socket. The spherical bearing member has a downwardly extending stem 24 provided with an enlarged base 25 which rests upon the upper leaf 26 of the vehicle spring 27. The stem 24 is provided with a relatively smaller screw threaded extension 28 which extends through a suitable aperture in the leaf 26 and nuts 29 serve firmly to secure the stem of the spherical member to the spring. In order to prevent detachment of the spherical bearing member 22 from its socket 21 the spherical bearing member is provided with an aperture 30 which extends diametrically therethrough transversely of the longitudinal axis of the spring and a pin 31 is inserted through the aperture 30 and anchored at its ends in the walls of the head. Desirably the aperture 30 is somewhat larger than the diameter of the pin to provide for a limited lateral movement between the link and the spring, but which will permit a free relative movement therebetween longitudinally of the spring.

The non-metallic resilient members are of considerably greater breadth laterally than longitudinally of the frame extension and spring. By reason of this construction the relatively narrow longitudinal areas of the non-resilient members permit a comparatively free swinging movement of the link member longitudinally of the vehicle frame about a center substantially in the horizontal plane of the aperture 10, the resilient members being compressed on diagonally opposite sides of the aperture when the lower end of the link member is forced longitudinally of the frame by the extension of the spring during its flexure. Lateral swinging movement of the link member, however, is restricted by reason of the greater masses of resilient material which are clamped respectively between the upper and lower seats of the link member and the lateral extensions 6 and 7 of the forged member 1. The universal joint which connects the end portion of the spring to the bolt member permits a free movement in any direction between the parts thus connected.

The spring shackle mechanism above described is simple in construction, effective in operation and durable. It presents a much smaller and more pleasing appearance than other spring shackle constructions heretofore used and can be made of any desired size to conform to the construction of the vehicle to which it is applied.

It will be understood that the embodiment of the invention disclosed herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. A spring shackle for connecting a leaf spring to the frame of a vehicle comprising a frame member having oppositely disposed seats, for blocks of non-metallic resilient material, presenting a surface of narrow width in the longitudinal direction of the spring and a surface of relatively great width transversely thereof, a link member extending through said frame member having seats complementary to the seats of said frame member to engage opposite surfaces of the respective blocks, means for clamping the seats of the link member upon said blocks and means for flexibly connecting said link to the spring.

2. A spring shackle for connecting a leaf spring to the frame of a vehicle comprising a frame member having oppositely disposed seats, for blocks of non-metallic resilient material, presenting a surface of narrow width in the longitudinal direction of the spring and a surface of relatively great width transversely thereof, a link member extending through said frame member having seats complementary to the seats of said frame member to engage opposite surfaces of the respective blocks, the seats of the frame member and link being recessed to receive said blocks and to present marginal retaining ribs acting to prevent displacement thereof, means for clamping the seats of the link members upon said blocks, and means flexibly connecting said link to the spring.

3. A spring shackle for connecting a leaf spring to the frame of a vehicle comprising a frame member having oppositely disposed seats, for blocks of non-metallic resilient material, presenting a surface of narrow width in the longitudinal direction of the spring and a surface of relatively great width transversely thereof, a link member extending through said frame member having seats complementary to the seats of said frame member to engage opposite surfaces of the respective blocks, means for clamping the seats of the link member upon said blocks, and a universal joint connecting said link to said spring.

4. A spring shackle for connecting a leaf spring to the frame of a vehicle comprising a forged frame member having oppositely disposed seats, for blocks of non-resilient material, presenting a surface of narrow width in the longitudinal direction of the spring and a surface of relatively great width transversely thereof, a link member having an integral head provided with a seat complementary to the block-receiving seat of said frame member, a stem extending from said head centrally through said frame member and provided with a screw threaded end, a cap having a seat complementary to the seat of said frame member, a nut on said link for clamping the head and cap upon said blocks with the frame member therebetween and means flexibly connecting said spring to the head of said block.

5. A spring shackle for connecting a leaf spring to the frame of a vehicle comprising a forged frame member having oppositely disposed seats, for blocks of non-resilient material, presenting a surface of narrow width in the longitudinal direction of the spring and a surface of relatively great width transversely thereof, a link member having an integral head provided with a seat complementary to the block-receiving seat of said frame member, and a ball-receiving socket, a stem extending from said head centrally through said frame member provided with a screw threaded end, a cap having a seat complementary to a seat of said frame member, a nut on said link for clamping said head and cap upon said blocks with the frame member therebetween and a bolt fixedly secured to the end of said spring engaging the socket in said head.

6. A spring shackle for connecting a leaf spring to the frame of a vehicle comprising a forged frame member having oppositely disposed seats, for blocks of non-resilient material, presenting a surface of narrow width in the longitudinal direction of the spring and a surface of relatively great width transversely thereof, a link member having an integral head provided with a seat complementary to the block-receiving seat of said frame member, a stem extending from said head centrally through said frame member and provided with a screw threaded end, a cap having a seat complementary to the seat of said frame member, a nut on said link for clamping the head and cap upon said blocks with the frame member therebetween, a shoulder on said stem acting to limit the clamping action of said cap and head upon said blocks and means for flexibly connecting said spring to the head of said link.

7. A spring shackle for connecting a leaf spring to the frame of a vehicle comprising a forged member constituting an extension of the end of the frame and having oppositely disposed parallel seats, for blocks of non-resilient material, presenting surfaces of narrow width in the longitudinal direction of the spring and of relatively great width transversely thereof, a link member having an integral head provided with a seat complementary to the lower block-receiving seat of said frame extension and a ball-receiving socket having a lining of lubricant-soaked wood, a stem extending from said head centrally through the frame member and provided with a screw threaded end, a cap having a seat complementary to the seat of said frame member, a nut on said link clamping said head and cap upon said blocks with the frame member therebetween, a shoulder on said stem limiting the clamping movement of said cap upon said blocks, a bolt fixedly secured to the end of said spring engaging the socket in the head of said link and means for preventing disengagement of said bolt and socket.

In testimony whereof, I have signed my name to this specification.

RALPH M. LOVEJOY.